*(12)* United States Patent
Abbas

(10) Patent No.: US 9,158,137 B1
(45) Date of Patent: Oct. 13, 2015

(54) SPREAD-SPECTRUM BIAS CONTROL

(75) Inventor: Gregory L. Abbas, Fall City, WA (US)

(73) Assignee: Eospace Inc., Redmond, WA (US)

( * ) Notice: Subject to any disclaimer, the term of this patent is extended or adjusted under 35 U.S.C. 154(b) by 500 days.

(21) Appl. No.: 13/601,726

(22) Filed: Aug. 31, 2012

Related U.S. Application Data

(60) Provisional application No. 61/530,544, filed on Sep. 2, 2011.

(51) Int. Cl.
*G02F 1/01* (2006.01)
*H04B 10/508* (2013.01)

(52) U.S. Cl.
CPC ............ *G02F 1/0123* (2013.01); *H04B 10/508* (2013.01)

(58) Field of Classification Search
CPC ... G02F 1/0123; H04B 10/505; H04B 10/508
See application file for complete search history.

(56) References Cited

U.S. PATENT DOCUMENTS

| | | | |
|---|---|---|---|
| 5,629,792 A * | 5/1997 | Masaki | 359/245 |
| 6,842,569 B2 | 1/2005 | Thaniyavarn | |
| 7,477,102 B1 * | 1/2009 | Ellis et al. | 330/133 |
| 7,643,708 B2 | 1/2010 | Kawano | |
| 7,916,981 B2 | 3/2011 | Kawano | |
| 2003/0112487 A1 * | 6/2003 | Fuller et al. | 359/239 |
| 2005/0012976 A1 * | 1/2005 | Harel et al. | 359/239 |
| 2006/0127103 A1 * | 6/2006 | Mazurczyk et al. | 398/188 |
| 2009/0034898 A1 | 2/2009 | Kawano | |

FOREIGN PATENT DOCUMENTS

| | | |
|---|---|---|
| JP | 2001-174766 | 6/2001 |
| JP | 2001-174766 | 7/2001 |
| JP | 2005-107225 | 4/2005 |
| JP | 2005-107229 | 4/2005 |

\* cited by examiner

*Primary Examiner* — Leon-Viet Nguyen
(74) *Attorney, Agent, or Firm* — James Creighton Wray

(57) ABSTRACT

An optical modulator has a continuous wave laser input, an RF input, a bias and dither input and an output. A photodiode connected to an output tap produces a voltage that is amplified. Noise is removed from the amplified output. A spread-spectrum dither harmonic is generated and supplied to a multiplier with the amplified and filtered feedback and is used to create a DC bias. A spread-spectrum dither is created and added to the DC bias. Spread spectrum dither and bias both are applied to the bias input of optical modulator. The bias and spread spectrum dither controller is usable with other non-optical modulators and other electronic devices.

26 Claims, 7 Drawing Sheets

SPREAD-SPECTRUM BIAS CONTROL

This application claims the benefit of U.S. Provisional Application No. 61/530,544, filed Sep. 2, 2011, which is hereby incorporated by reference in its entirety as if fully set forth herein.

This invention was made with Government support under DARPA Contract Nos. W31P4Q-07-C-0259 and W31P4Q-08-C-0393 and FA8650-10-C-7002 awarded by the Department of Defense. The Government has certain rights in this invention.

BACKGROUND OF THE INVENTION

The Mach-Zehnder electro-optical modulator is an important device in optical communication systems. The basic operation of a Mach-Zehnder interferometric intensity modulator is described in U.S. Pat. No. 5,074,631, Hamano et al. (1991). Their patent discloses a technique of using separate electrodes and drive units for the two optical waveguides of the interferometer to eliminate the effects of temperature fluctuations and to reduce the drive voltages.

U.S. Pat. No. 6,046,838, Kou et al. (2000) discloses an automatic bias control for electro-optic modulators, which uses one or two pilot tones (a dither signal with a single frequency or a combination of two different frequencies) for controlling the DC bias point to eliminate the time-varying effects of the physical process in the modulator, such as those caused by temperature fluctuations. U.S. Pat. No. 6,392,779, Iannelli et al. (2002), discloses another automatic bias control system that uses two pilot tones that are swept in frequency over a frequency range to allow the amplitude of the pilot tones to be increased, so that the signal level for the control circuit is increased.

U.S. Pat. No. 7,034,977, Harel et al. (2006), discloses an automatic DC bias control for duobinary modulation with a Mach-Zehnder electro-optical modulator. The automatic DC bias control uses a dither, and the feedback signal is demodulated synchronously with the spread-spectrum source that generates the dither. The control circuit adjusts the dither signal to maintain a constant value of a component of the optical output signal that is synchronous with the dither. However, the disclosed approach for automatic DC bias control applies only to the duobinary modulation format utilizing low-pass electrical filtering of binary electrical signal. Furthermore, there is no discussion about the design and specifications of the spread-spectrum source for achieving automatic DC bias control.

Despite the aforementioned concepts for maintaining the proper bias condition of a Mach-Zehnder modulator, today a typical bias controller still employs the conventional approach (illustrated in FIG. 1) of using a low-frequency dither signal of approximately 1 KHz, with the bias controller minimizing the second harmonic of the feedback signal.

Needs exist for improved bias controllers for optical modulators.

SUMMARY OF THE INVENTION

This application relates to methods and apparatus of using spread-spectrum techniques for controlling the DC bias point of an electro-optical Mach-Zehnder interferometric intensity modulator.

The invention can be used for other optical modulators and for more general and non-optical applications where a bias controlled is needed to set a bias point with a particular harmonic ratio.

The invention would work for other types of optical modulators such as directional couplers or electro-absorption modulators. The invention would work for non-optical modulators such as RF modulators that need to use a dither to hold a bias point that nulls second harmonic or holds a ratio of first to second harmonic. The invention would be used for linear analog communication links that are trying to null second harmonic.

The invention provides spread-spectrum dither signals which are added to a bias applied to a modulator, an optical modulator or an analog communications link. The spread-spectrum dither signals are free of second harmonics. Feedback from the optical modulator output is converted to electrical signals. The electrical signals are band-pass filtered to pass second harmonics which are provided to a multiplier. Second harmonics from a frequency doubler connected to the spread-spectrum dither source or from a local oscillator are provided to the multiplier. The multiplier sends the signals to a time integrator and error amplifier, a power detector or an A/D converter and microprocessors to produce a bias. The bias and spread-spectrum dither signal are summed and filtered and provided as a bias plus dither to the optical modulator. The spread-spectrum dither increases spur-free dynamic range and increases signal to noise ratio of optical links.

These and further and other objects and features of the invention are apparent in the disclosure, which includes the above and ongoing written specification, with the claims and the drawings

DETAILED DESCRIPTION OF THE DRAWINGS

Figure 1:
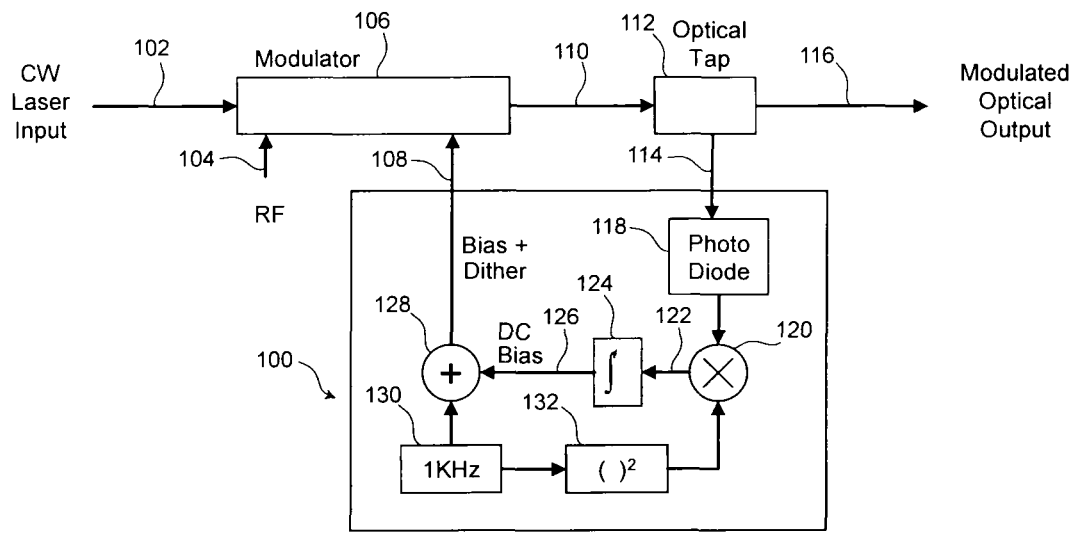
FIG. 1 is a block diagram illustrating one embodiment of the conventional approach for controlling the DC bias of an electro-optic modulator.

FIG. 1 describes a prior art system to illustrate the problem to be solved. In FIG. 1, modulator 106 uses radio frequency (RF) signal 104 and bias+dither signal 108 (from bias controller 100) to modulate input optical signal 102 to produce modulated optical signal 110. Optical tap 112 taps off a small portion (such as 1%) of the modulated optical signal 110 to produce a feedback optical signal 114 for bias controller 100, and the remaining signal is output as modulated optical output 116. Bias controller 100 uses photodiode 118 to convert feedback optical signal 114 to an electrical signal for adjusting DC bias 126, so that the second harmonic of the feedback dither signal is minimized.

In bias controller 100, multiplier 120 mixes the second harmonic of the 1-KHz feedback signal (from photodiode 118) down to DC with a 2 KHz signal obtained from frequency-doubler circuit 132, which simply squares the 1-KHz CW sinusoidal signal from dither signal source 130. Low-pass filtering and error amplifying of multiplier output signal 122 with time integrator and error amplifier 124 produce DC bias 126 for modulator 106. Summing circuit 128 combines DC bias 126 with the 1-KHz dither signal from dither signal source 130 to produce bias+dither signal 108, and DC bias 126 is automatically adjusted to minimize the error signal component (the DC component of multiplier output signal 122) through the feedback loop facilitated by bias controller 100. However, this conventional approach introduces 1-KHz offset spurs on modulated optical output 116, and the spur-free dynamic range (SFDR) is reduced.

Figure 2:
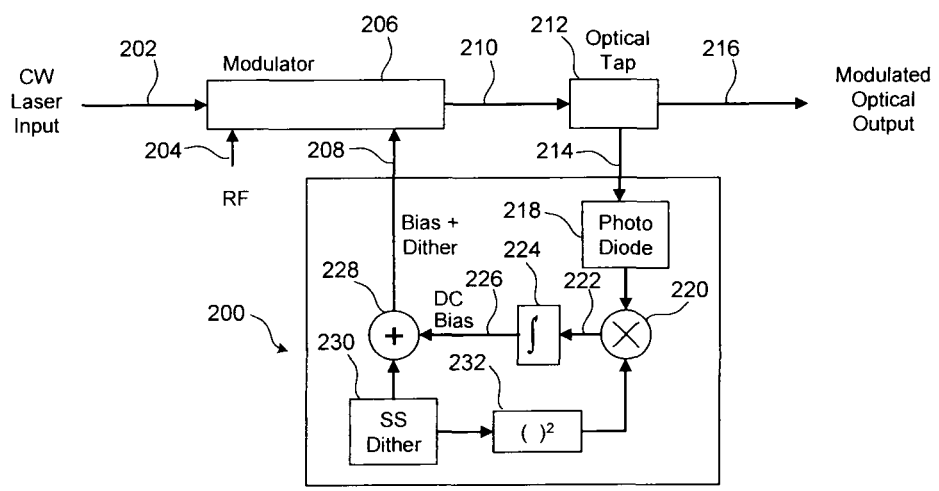
FIG. 2 is a block diagram illustrating the spread-spectrum dither approach for controlling the DC bias of an electro-optic modulator in accordance with the present invention.

FIG. 2 is a block diagram illustrating the new spread-spectrum dither approach for solving the problem of the prior art and controlling the DC bias of an electro-optic modulator in accordance with the present invention. In this approach, the continuous wave (CW) sinusoidal dither of the conventional approach is replaced with a spread-spectrum dither, so that the dither spurs are spread over a wide frequency range (such as from 1 KHz to 2 MHz) to directly increase the SFDR. The spread-spectrum dither can be produced with the new frequency-hopped method in the first embodiment or the new direct-sequence phase-modulated method in the second embodiment.

In FIG. 2, modulator 206 uses RF signal 204 and bias+dither signal 208 (from bias controller 200) to modulate input optical signal 202 to produce modulated optical signal 210. Optical tap 212 taps off a small portion (such as 1%) of the modulated optical signal 210 to produce feedback optical signal 214 for bias controller 200, and the remaining signal is output as modulated optical output 216. Bias controller 200 uses photodiode 218 to convert feedback optical signal 214 to an electrical signal for adjusting DC bias 226, so that the second harmonic of the feedback spread-spectrum dither signal is minimized.

In bias controller 200, multiplier 220 mixes the second harmonic of the feedback spread-spectrum dither signal (from photodiode 118) down to DC with a signal obtained from frequency-doubler circuit 232, which simply squares the signal from spread-spectrum dither signal source 230. Low-pass filtering and error amplifying of multiplier output signal 222 with time integrator and error amplifier 224 produce DC bias 226 for modulator 206. Summing circuit 228 combines DC bias 226 with the signal from spread-spectrum dither signal source 230 to produce bias+dither signal 208, and DC bias 226 is automatically adjusted to minimize the error signal component (the DC component of multiplier output signal 222) through the feedback loop facilitated by bias controller 200, which may include, in addition to the components shown in FIG. 2, a microprocessor, an analog signal processor (such as filters), or a digital signal processor, as well known in the art.

Typically, spread-spectrum dither signal source 230 must be filtered to remove any second harmonic before it is applied to modulator 206. In addition, RF signal 204 typically must be filtered to prevent interfering modulation at the second-harmonic frequency. Instead of mixing the dither second harmonic down to DC, the output of photodiode 218 can be sampled and digitally processed to minimize the dither second harmonic. Many techniques, such as direct digital syntheses and digital phase-locked loops, may be used for generating the spread-spectrum dither and a signal of twice the frequency of the dither, so that frequency-doubler circuit 232 may not be needed. Furthermore, multiplier 220 may mix the second harmonic of the feedback dither not all the way down to DC, but to an intermediate frequency (such as between 1 KHz and 300 KHz) instead, so that effects of the DC offset voltages of circuit components and interference from an environmental 60-Hz AC power line may be minimized. In this case, spread-spectrum dither signal source 230 generates a signal of an appropriate frequency for multiplier 220 to mix the second harmonic of the feedback dither down to an intermediate frequency, and the time-integrating function of time integrator and error amplifier 224 may be replaced with a signal power detector. The error amplifying function of time integrator and error amplifier 224 may be achieved with analog and digital circuits, such as A/D converters and microprocessors, to produce an appropriate DC bias 226 for modulator 206. Furthermore, additional analog or digital filters may be used for improving the signal-to-noise ratio.

Figure 3:
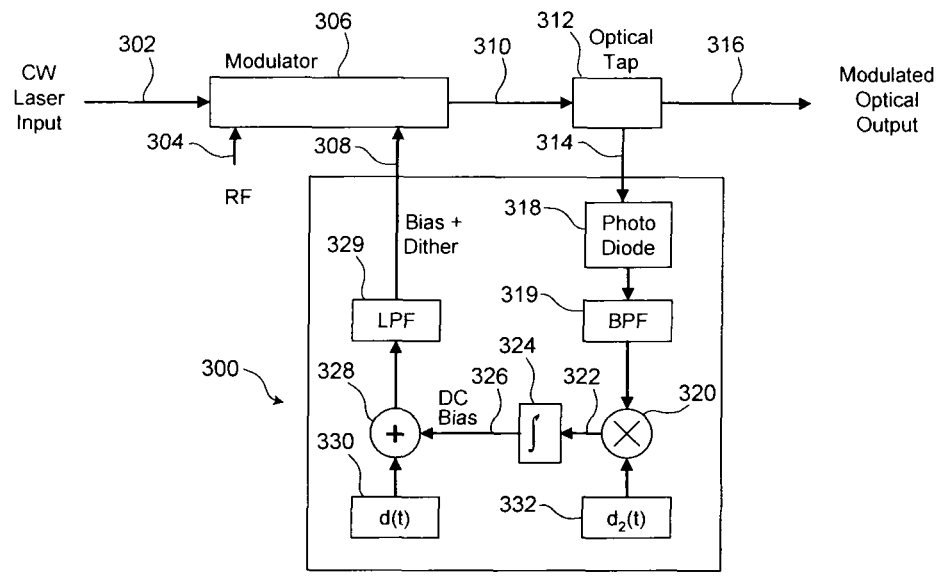
FIG. 3 is a block diagram illustrating the frequency-hopped dither approach for controlling the DC bias of an electro-optic modulator in accordance with a first embodiment.

FIG. 3 is a block diagram illustrating the frequency-hopped dither approach for controlling the DC bias of an electro-optic modulator in accordance with the first embodiment. In the first embodiment, the frequency of dither signal source 330 is varied over a frequency range (such as between 1 KHz and 1 MHz) to produce the spread-spectrum dither, and local oscillator 332 generates a signal with a frequency (such as between 2 KHz and 2 MHz) that is about equal to the feedback dither signal's second harmonic, so that the frequency of multiplier output signal 322 is a constant frequency, such as DC or a few hundred kilohertz. The dither frequency may be varied linearly as a chirp, or a random dither frequency variation may be achieved with a hardware or software pseudo-random generator.

In FIG. 3, modulator 306 uses RF signal 304 and bias+dither signal 308 (from bias controller 300) to modulate input optical signal 302 to produce modulated optical signal 310. Optical tap 312 taps off a small portion (such as 1%) of the modulated optical signal 310 to produce feedback optical signal 314 for bias controller 300, and the remaining signal is output as modulated optical output 316. Bias controller 300 uses photodiode 318 to convert feedback optical signal 314 to an electrical signal for adjusting DC bias 326, so that the second harmonic of the feedback dither is minimized.

In bias controller 300, the signal from photodiode 318 is filtered by band-pass filter 319, which has a pass band for the spread-spectrum dither signal's second harmonic (such as between 2 KHz and 2 MHz), so that noises with frequencies outside the pass band are rejected. Multiplier 320 mixes the second harmonic of the feedback spread-spectrum dither signal (from band-pass filter 319) down to a constant frequency (such as DC or a few hundred kilohertz) with a signal obtained from local oscillator 332. Low-pass filtering and error amplifying of multiplier output signal 322 with time integrator (or power detector) and error amplifier 324 produce DC bias 326 for modulator 306. Summing circuit 328 combines DC bias 326 with the signal from spread-spectrum dither signal source 330 to produce bias+dither signal 308 after filtering with low-pass filter 329, which has a pass band (such as from DC to 1 MHz) for DC bias 326 and the dither signal. DC bias 326 is automatically adjusted to minimize the error signal component (the DC or the few hundred kilohertz signal component of multiplier output signal 322) through the feedback loop facilitated by bias controller 300, which may include, in addition to the components shown in FIG. 3, a microprocessor, an analog signal processor (such as filters), or a digital signal processor, as well known in the art.

Figure 4:
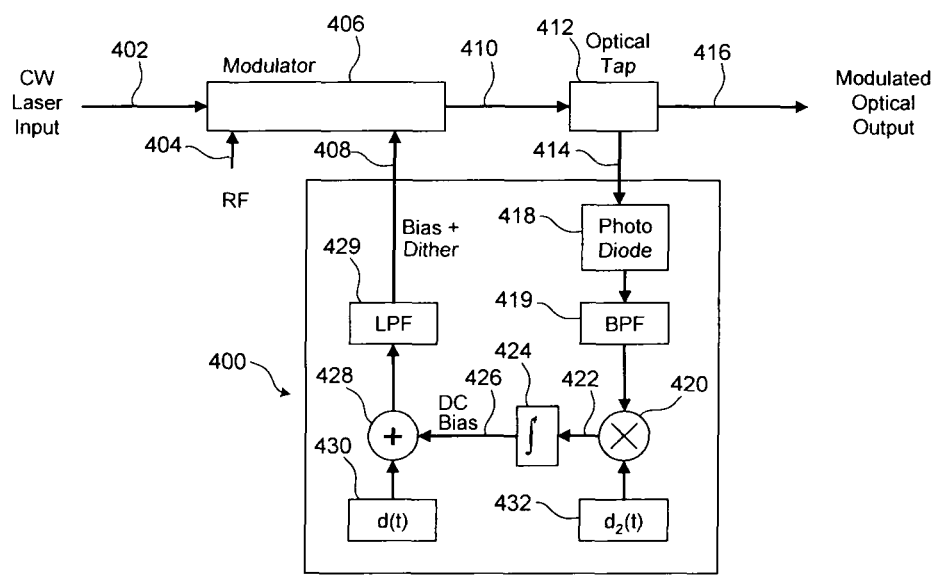
FIG. 4 is a block diagram illustrating the direct-sequence phase modulated dither approach for controlling the DC bias of an electro-optic modulator in accordance with a second embodiment.
Figure 5:
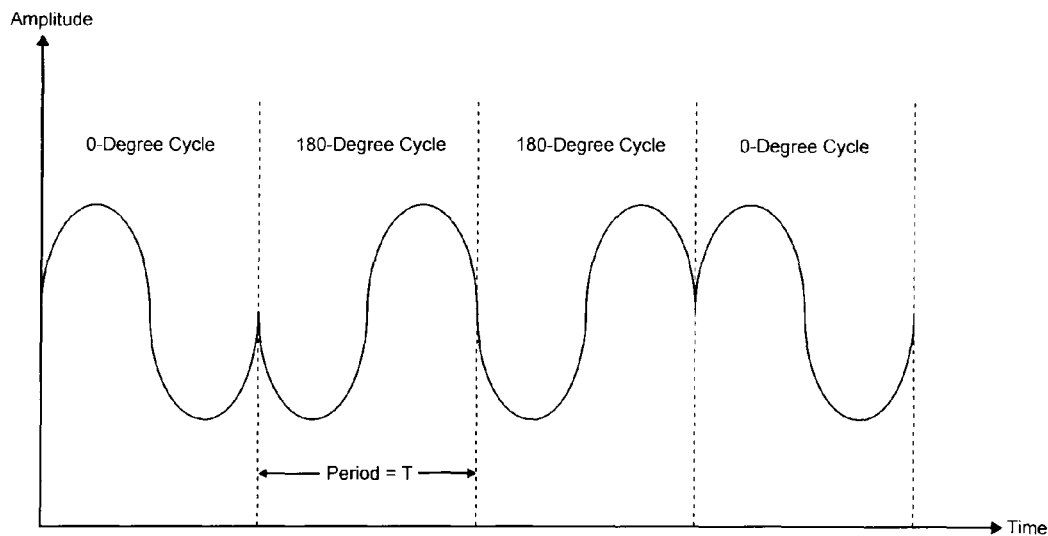
FIG. 5 is a signal waveform illustrating four cycles of a pseudo-randomly phase modulated sinusoidal dither signal.
Figure 6:
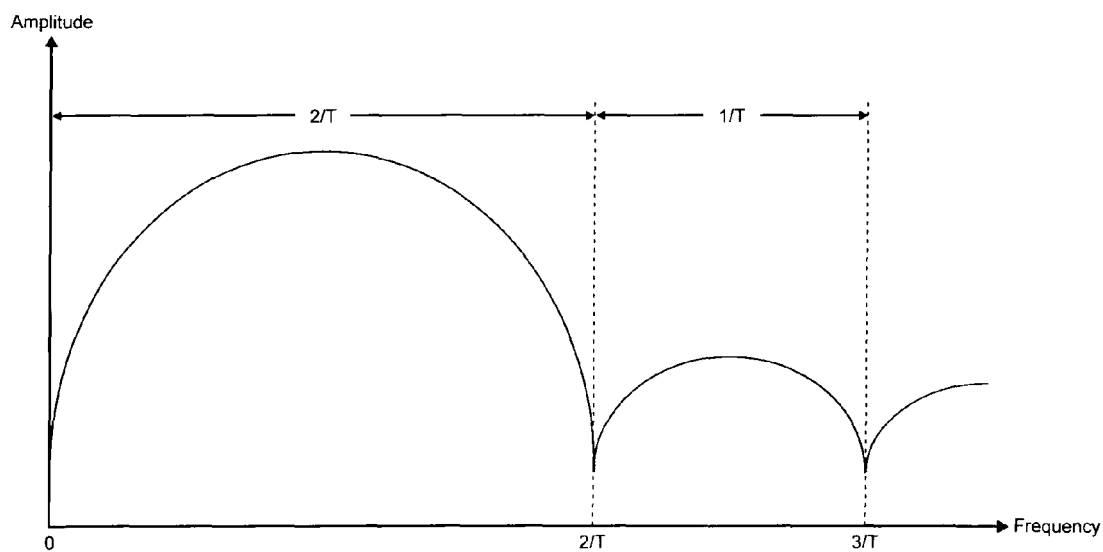
FIG. 6 is a spread-spectrum dither power spectrum illustrating the second harmonic would be located at a null of the power spectrum.

FIG. 4 is a block diagram illustrating the direct-sequence phase modulated dither approach for controlling the DC bias of an electro-optic modulator in accordance with the second embodiment. In the second embodiment, pseudo-random phase modulation of a CW sinusoidal dither signal (such as a 1-MHz sinusoidal signal) produces a spread-spectrum (such as from DC to 2 MHz) dither signal at the output of dither signal source 430. Local oscillator 432 generates a CW sinusoidal signal that is phase locked to the CW dither signal, with a frequency (such as 2 MHz) and phase that is twice that of the CW dither signal. The pseudo-random phase modulation may be achieved with a hardware or software pseudo-random number generator. For example, pseudo-random phase modulation of either 0 or 180 degrees for each cycle of the sinusoidal dither signal may be accomplished with the control of a linear feedback shift register implemented in a microprocessor that generates a pseudo-random binary number of either 0 or 1. FIG. 5 illustrates four of a large number of cycles of such pseudo-randomly
phase modulated sinusoidal dither signal of period T, and as an example, the phase modulations of the four cycles are 0, 180, 180, and 0 degrees sequentially. In this case, the second harmonic simplifies to a CW carrier tone at twice the dither frequency 2/T. FIG. 6 illustrates the power spectrum of the spread-spectrum dither, showing that the second-harmonic CW tone at a frequency of 2/T would be located at a null of the power spectrum and can be detected with high signal-to-noise ratio.

In FIG. 4, modulator 406 uses RF signal 404 and bias+ dither signal 408 (from bias controller 400) to modulate input optical signal 402 to produce modulated optical signal 410. Optical tap 412 taps off a small portion (such as 1%) of the modulated optical signal 410 to produce feedback optical signal 414 for bias controller 400, and the remaining signal is output as modulated optical output 416. Bias controller 400 uses photodiode 418 to convert feedback optical signal 414 to an electrical signal for adjusting DC bias 426, so that the second harmonic (such as 2 MHz) of the feedback dither is minimized.

In bias controller 400, the signal from photodiode 418 is filtered by band-pass filter 419, which has a pass band for the dither signal's second harmonic (such as 2 MHz), so that noises with frequencies outside the pass band are rejected. Multiplier 420 mixes the second harmonic of the feedback dither signal (from band-pass filter 418) down to a constant frequency (such as DC or a few hundred kilohertz) with a signal obtained from local oscillator 432. Low-pass filtering and error amplifying of multiplier output signal 422 with time integrator (or power detector) and error amplifier 424 produces DC bias 426 for modulator 406. Summing circuit 428 combines DC bias 426 with the signal from spread-spectrum dither signal source 430 to produce bias+dither signal 408 after filtering with low-pass filter 429, which has a pass band (such as from DC to 2 MHz) for DC bias 426 and the dither signal. DC bias 426 is automatically adjusted to minimize the error signal component (the DC or the few hundred kilohertz signal component of multiplier output signal 422) through the feedback loop facilitated by bias controller 400, which may include, in addition to the components shown in FIG. 4, a microprocessor, an analog signal processor (such as filters) or a digital signal processor, as well known in the art.

Alternatively, for the case of a two-phase spread-spectrum dither, the second harmonic at the output of band-pass filter 419 is not mixed down to DC or an intermediate frequency (such as a few hundred kilohertz) by multiplier 420 and local oscillator 432, but the output of the band-pass filter 419 is sent directly to power detector and error amplifier 424 for adjusting DC bias 426 to minimize the second harmonic of the feedback dither signal. Similarly, DC bias 426 is automatically adjusted to minimize the error signal component (the second harmonic of the dither signal in this case) through the feedback loop facilitated by bias controller 400. The power detection can be achieved by an analog detector or by analog-to-digital conversion followed by digital signal processing. In this approach, band-pass filter 419 can be an active band-pass filter, a switched-capacitor band-pass filter, or a crystal band-pass filter, depending on the second-harmonic frequency and the required filter bandwidth for achieving the desired signal-to-noise ratio. FIG. 5 is a signal waveform illustrating four cycles of a pseudo-randomly modulated sinusoidal dither signal. FIG. 6 is a spread-spectrum dither power spectrum illustrating the second harmonic would be located at a null of the power spectrum. A detailed block diagram of this two-phase spread-spectrum dither approach is shown in FIG. 7.

Figure 7:
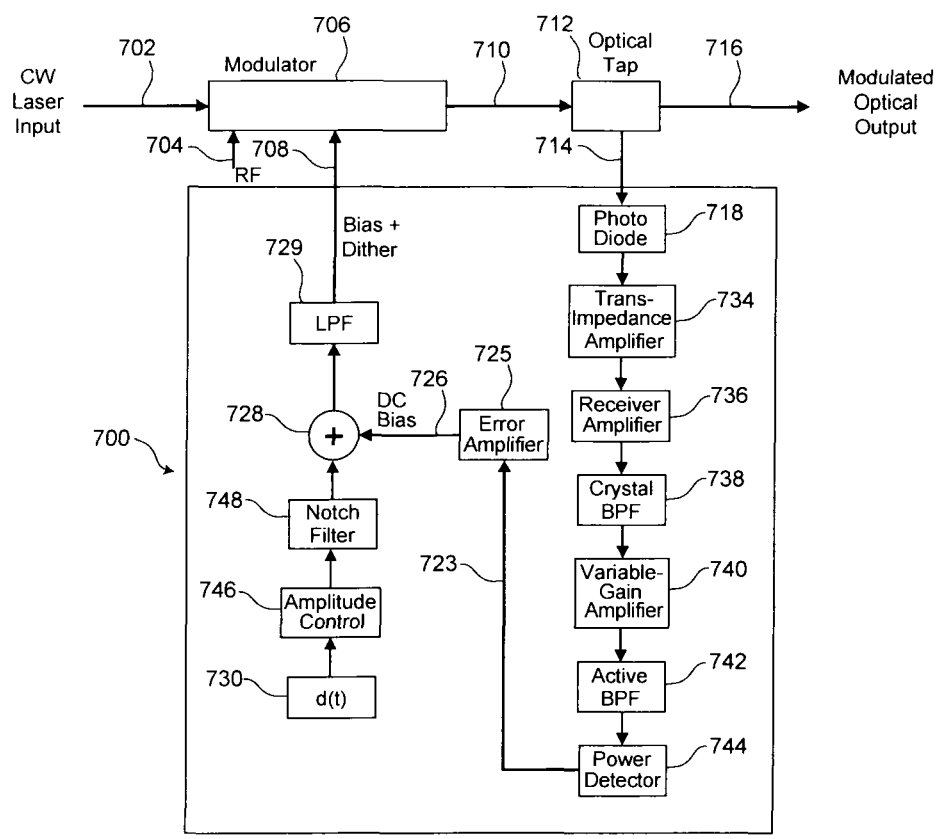
FIG. 7 is a detailed block diagram illustrating the direct-sequence phase modulated dither approach without using a mixer for controlling the DC bias of an electro-optic modulator in accordance with the second embodiment.

In FIG. 7, modulator 706 uses RF signal 704 and bias+ dither signal 708 (from bias controller 700) to modulate input optical signal 702 to produce modulated optical signal 710. Optical tap 712 taps off a small portion (such as 1%) of the modulated optical signal 710 to produce feedback optical signal 714 for bias controller 700, and the remaining signal is output as modulated optical output 716. Bias controller 700 uses photodiode 718 to convert feedback optical signal 714 to an electrical signal for adjusting DC bias 726, so that the second harmonic (such as 5 MHz) of the feedback dither is minimized.

In bias controller 700, the current signal from photodiode 718 is converted to a voltage signal by trans-impedance amplifier 734 and then amplified by receiver amplifier 736. Crystal band-pass filter 738, which has a pass band for the second harmonic (such as 5 MHz), filters the signal from receiver amplifier 736, so that the spread-spectrum dither and noises with frequencies outside the pass band are rejected. The output of crystal band-pass filter 738 is buffered by variable-gain amplifier 740 before it is further filtered by active band-pass filter 742 to produce the second harmonic to power detector 744 for feedback control. Power detector 744 can be an analog power detector, such as a logarithmic amplifier, or it can be implemented by digital signal processing of the second harmonic after analog-to-digital conversion. Error amplifier 725, which can also be implemented digitally, produces DC bias 726 for modulator 706. Summing circuit 728 combines DC bias 726 with the amplitude controlled and filtered signal from spread-spectrum dither signal source 730 to produce bias+dither signal 708 after filtering with low-pass filter 729, which has a pass band (such as from DC to 5 MHz) for DC bias 726 and the dither signal. Spread-spectrum dither signal source 730, with a sinusoidal signal frequency of up to about 2.5 MHz, can be implemented with a small, low-cost, and low-power integrated circuit under the control of a microprocessor. Amplitude control 746 adjusts the signal level of the spread-spectrum dither to a desired level, and notch filter 748 removes the second harmonic of the spread-spectrum dither before it is applied to modulator 706 for the case of a two-phase spread-spectrum dither. DC bias 726 is automatically adjusted to minimize the error signal component through the feedback loop facilitated by bias controller 700, which may consist of, in addition to the components shown in FIG. 7, a microprocessor, an analog signal processor (such as filters) or a digital signal processor, as well known in the art.

Figure 8:
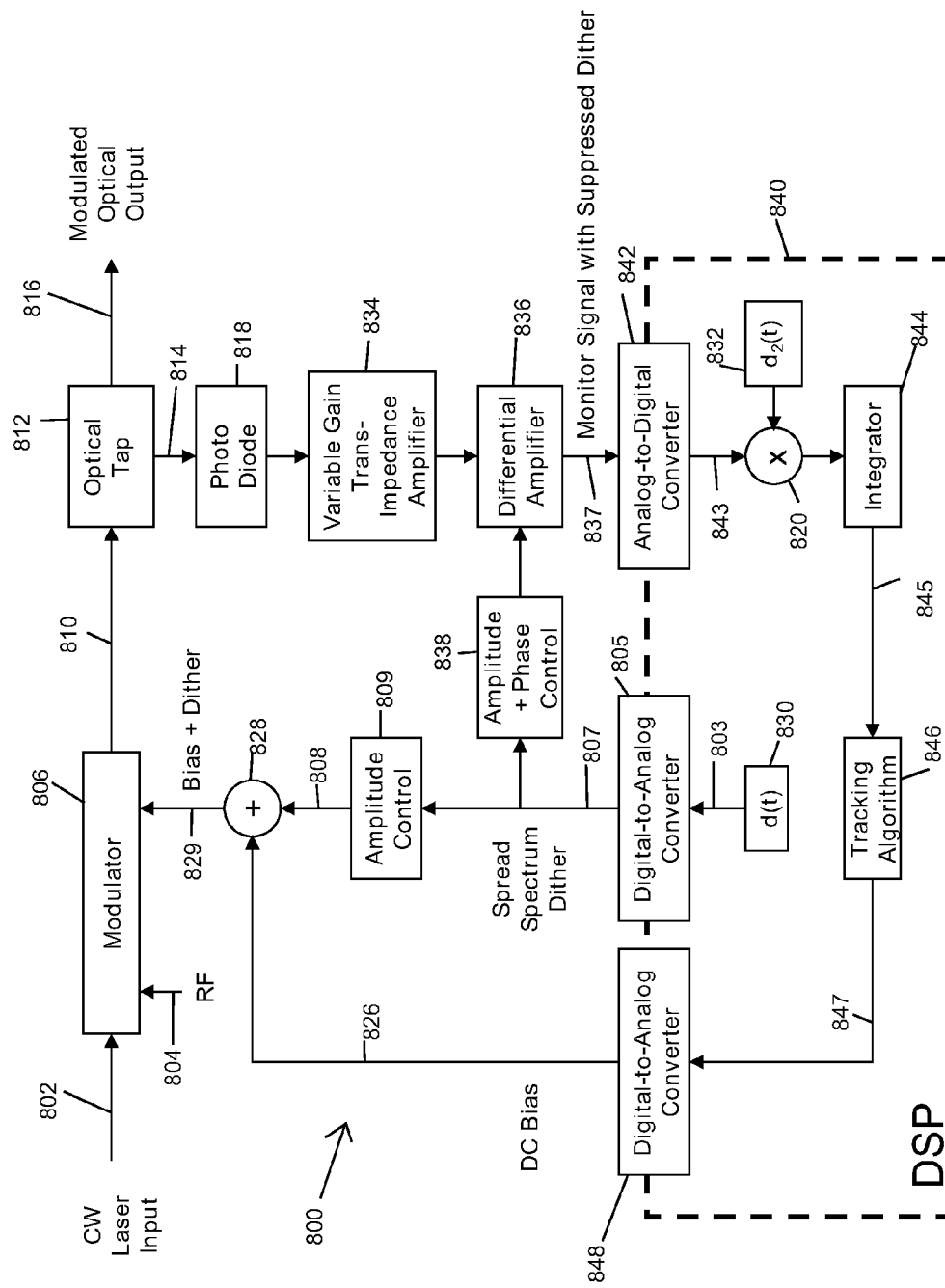
FIG. 8 is a block diagram of an embodiment of the spread-spectrum dither approach using a combination of analog and digital signal processing techniques.

FIG. 8 is a block diagram of an embodiment of the spread-spectrum dither approach using a combination of analog and digital signal processing techniques. This embodiment is appropriate for the previously discussed two-phase spread-spectrum dither approach and also for more general cases such as the four-phase spread-spectrum dither approach shown in FIGS. 9 and 10. In FIG. 8, modulator 806 uses RF signal 804 and bias+dither signal 829 from bias controller 800 to modulate input optical signal 802 to produce modulated optical signal 810. Optical tap 812 taps off a small portion (such as 1%) of the modulated optical signal 810 to produce feedback optical signal 814 for bias controller 800, and the remaining signal is output as modulated optical output 816. Bias controller 800 uses photodiode 818 to convert feedback optical signal 814 to an electrical signal for adjusting DC bias 826, so that the second harmonic of the feedback dither is minimized.

In bias controller 800, the current signal from photodiode 818 is converted to a voltage signal by variable gain trans-impedance amplifier 834 and then is amplified by differential amplifier 836. A monitor signal 837 with suppressed dither is produced by applying amplitude plus phase control 838 from the spread-spectrum analog signal 807.

The bias 826 and spread-spectrum dither 807 are provided from the digital signal processor 840. The bias 826 can be implemented by digital signal processing of the second harmonic after analog-to-digital conversion. Summing circuit 828 combines DC bias 826 with the spread-spectrum dither 808. Amplitude control 809 dither provides signal 807 from a digital-to-analog converter 805 and spread-spectrum dither signal processor 830 to produce bias+dither signal 808 after amplitude control 808. Spread-spectrum dither signal 808, with a sinusoidal signal frequency of up to about 2.5 MHz, can be implemented with a small, low-cost, and low-power integrated circuit 830 under the control of a microprocessor 840. Digital-to-analog converter 805 converts the digital dither 803 to an analog dither 807. Amplitude control 809 adjusts the signal level of the spread-spectrum dither 808 to a desired level.

The digital signal processor 840 has an analog-to-digital converter 842 that converts amplified feedback analog signal 837 to a digital signal 843. Multiplier 820 inserts a digital second harmonic dither signal from a source 832. Multiplier supplies the resultant signal to integrator 844. The integrated signal 845 is supplied to a tracking algorithm 846, which supplies the digital bias signal 847 to digital-to-analog converter 848 that provides the DC bias 826.

Figure 9:
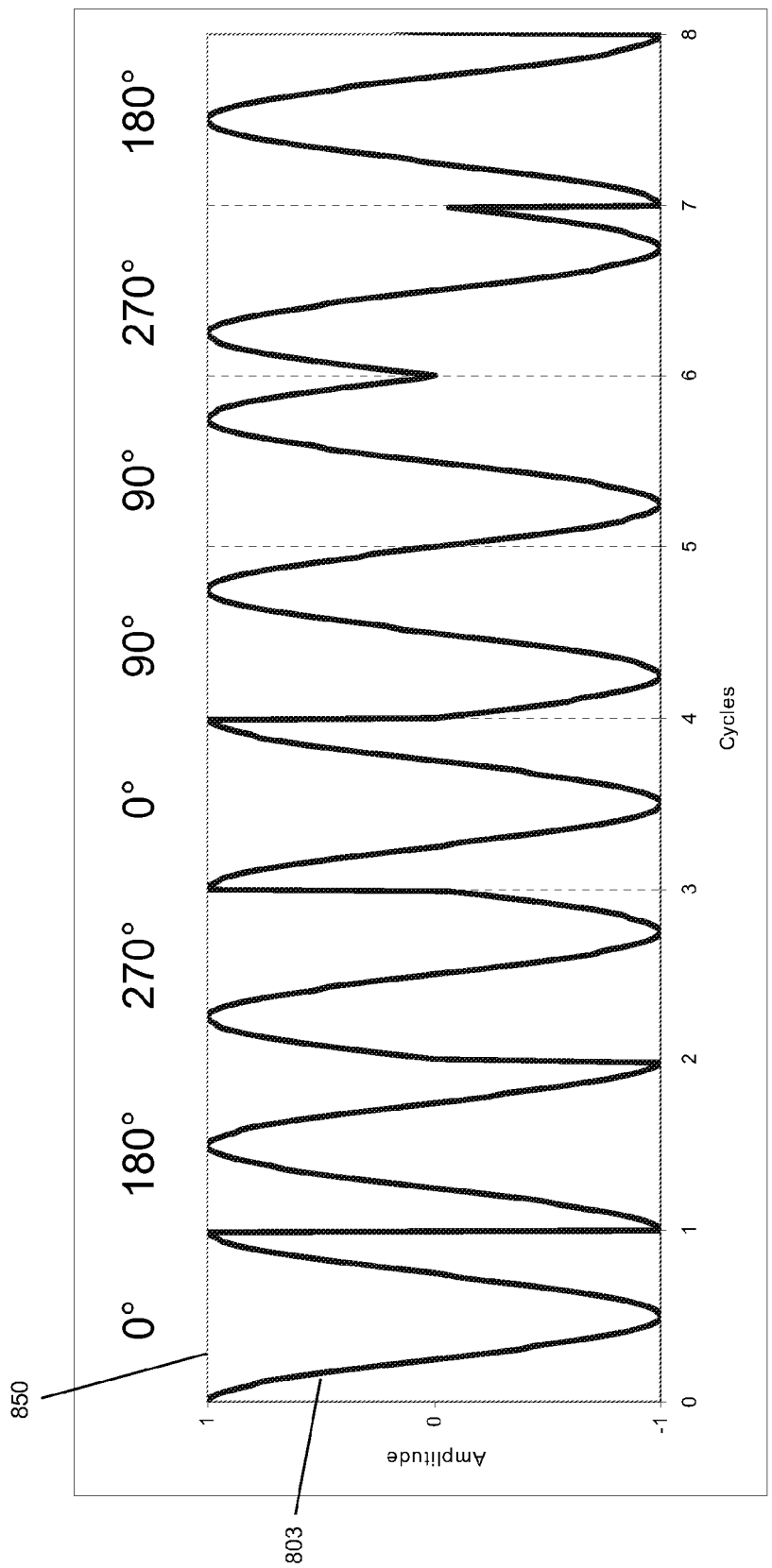
FIG. 9 shows one example where the dither signal, d(t), is a continuous wave carrier that is pseudo-randomly phase modulated with one of four phases (0, 90, 180, or 270 degrees) once per cycle.

FIG. 9 shows one example where the dither signal, d(t) 803, is a continuous wave carrier that is pseudo-randomly phase modulated with one of four phases (0, 90, 180, or 270 degrees) once per cycle. As shown in FIG. 8, the digital dither signal, d(t) 803, is generated from a source 830 in the digital signal processor 840. The dither signal 803 is converted to an analog signal 807. Its amplitude 850 shown in FIG. 9 is adjusted 809 for the application (typically ~1% of the modulator Vpi), and it is combined 828 with a DC bias voltage 826 and applied to the modulator bias control input 829. The modulated output 810 of the modulator 806 is tapped 812 and detected by the photodiode 818. The photodetector current is amplified by a variable-gain trans-impedance amplifier 834. The amplifier gain is adjusted to allow for varying levels of CW laser light, modulator insertion loss, tap ratios, and photodiode quantum efficiencies so that the signal going into the differential amplifier is relatively constant in amplitude. A second copy of the dither signal 807 is adjusted in amplitude and phase 838 and then subtracted from the photodiode monitor signal. This suppresses the common mode dither signal and simplifies processing of the relatively weak second harmonic signal of the modulator. Without some rejection of the dither signal, the monitor photodiode receiver amplifier chain can distort and produce its own second harmonic signal that can significantly interfere with the bias tracking algorithm. In the previously discussed embodiments of the bias controller (namely, the CW dither tone and the two-phase modulated tone), this separation of the dither signal from its second harmonic could be accomplished using bandpass filtering. However, for the four-phase spread-spectrum dither approach, the second harmonic of the dither is also a spread-spectrum signal and overlaps in frequency space with the dither signal. After the differential amplifier, the photodiode monitor signal with suppressed dither is sampled and processed digitally.

Figure 10:
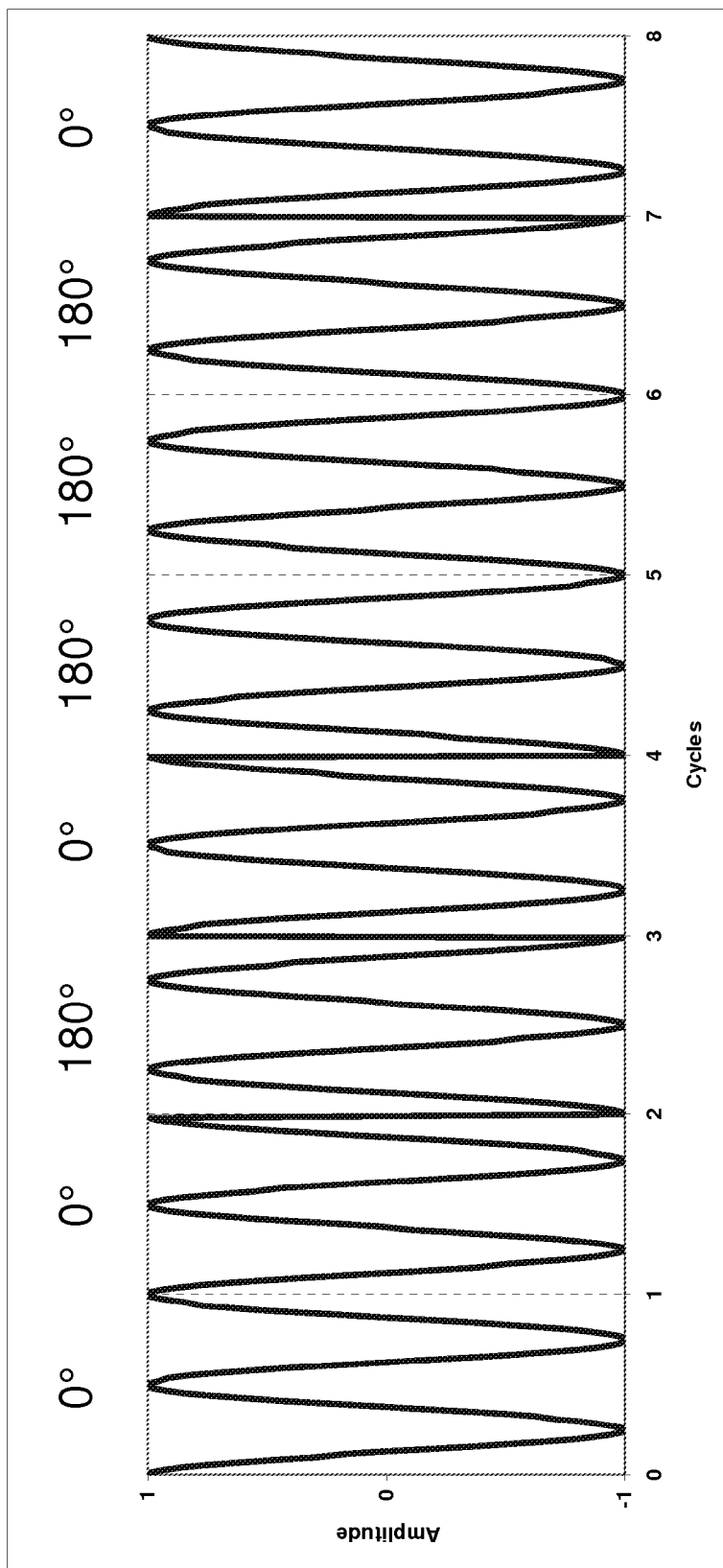
FIG. 10 shows an example of the de-spreading second harmonic signal $d_2(t)$.

An example of the de-spreading second harmonic signal, $d_2(t)$, is shown in FIG. 10. The de-spreading signal is also itself a spread-spectrum signal. This has the important advantage (relative to the conventional continuous wave and the two-phase spread-spectrum dither approaches) that the third order dither spurs at the link output will be spread and not limit the link's dynamic range. The output of the digital multiplier is integrated over many cycles to produce an error signal that is used to adjust the modulator DC bias. If the DC bias is adjusted to minimize the second-harmonic error signal, the bias controller will lock to a quadrature point of the optical modulator. The tracking algorithm 846 shown in FIG. 8 can also be used to hold a desired ratio of dither first harmonic to dither second harmonic. This allows the optical modulator bias to be set to any desired operating point (positive or negative quadrature, peak, null, or any phase angle in between).

Using a differential amplifier 836 in the photodiode monitor receiver suppresses the dither signal in the amplifier chain, reduces second harmonic generated by the amplifiers, and improves bias control accuracy.

Using a spread-spectrum dither signal that has a second harmonic which is also a spread-spectrum signal has the advantage that all the third-order dither spurs have spread-spectra and do not limit the optical link modulator dynamic range.

Using a variable gain trans-impedance amplifier in the photodiode monitor receiver minimizes receiver noise, maximizes receiver sensitivity, holds signal levels relatively constant over a wide range of laser powers and taps ratios for more accurate downstream processing.

While the invention has been described with reference to specific embodiments, modifications and variations of the invention may be constructed without departing from the scope of the invention, which is defined in the following claims.

What is claimed is:

1. A system comprising:
   a modulator,
   a RF signal source connected to the modulator,
   a signal output connected to the modulator,
   a tap connected to the signal output of the modulator,
   a dither and bias controller connected to the modulator and to the tap,
   the dither and bias controller having:
      a controller input connected to the tap, and
      a controller output connected to the modulator,
      the controller having a receiver connected to the tap for providing a bias, a summing circuit having a bias input,
a spread-spectrum dither source connected to the summing circuit,
the summing circuit having a bias and spread-spectrum dither output connected to the controller output,
further comprising a band pass filter connected to an output of the receiver and a multiplier circuit connected to the band pass filter, a frequency source connected to the multiplier circuit, a time integrator and error amplifier or power detector connected between the multiplier circuit and the summing circuit for producing the bias,
wherein the frequency source is a local oscillator, the spread-spectrum dither signal source produces a pseudo-random phase modulated continuous wave sinusoidal dither signal, and the local oscillator produces a continuous wave sinusoidal signal that is phase locked to the continuous wave sinusoidal dither signal.

2. The system of claim 1, wherein the local oscillator produces a signal with a frequency which is about equal to a second harmonic of the spread-spectrum dither signal.

3. A system comprising:
a modulator,
a RF signal source connected to the modulator,
a signal output connected to the modulator,
a tap connected to the signal output of the modulator,
a dither and bias controller connected to the modulator and to the tap,
the dither and bias controller having:
a controller input connected to the tap, and
a controller output connected to the modulator,
the controller having a receiver connected to the tap for providing a bias,
a summing circuit having a bias input,
a spread-spectrum dither source connected to the summing circuit,
the summing circuit having a bias and spread-spectrum dither output connected to the controller output,
a low pass filter connected between the summing circuit and the controller output adapted for passing the bias plus the spread-spectrum dither signal,
a trans-impedance amplifier connected to an output of the receiver and adapted for converting the output of the receiver to a voltage, a receiver amplifier connected to an output of the trans-impedance amplifier and adapted for amplifying the voltage output from the trans-impedance amplifier, a crystal band-pass filter connected to an output of the receiver amplifier and adapted for passing a second harmonic of the spread-spectrum dither signal, a variable gain amplifier connected to an output of the crystal band-pass filter and adapted for buffering the output of the band-pass filter, an active band-pass filter connected to an output of the a variable gain amplifier and adapted for passing the second harmonic, a power detector connected to an output of the active band-pass filter, and an error amplifier connected to an output of the power detector, the error amplifier having an output connected to the summing circuit for supplying bias to the summing circuit.

4. The system of claim 3, further comprising an amplitude control connected to an output of the spread-spectrum dither signal source and adapted for adjusting a level of the spread-spectrum dither signal, and a notch filter connected to an output of the amplitude control and adapted for removing a second harmonic of the spread-spectrum dither signal, the notch filter having an output connected to the summing circuit for providing the spread-spectrum dither signal to the summing circuit.

5. A system comprising:
a modulator,
a RF signal source connected to the modulator,
a signal output connected to the modulator,
a tap connected to the signal output of the modulator,
a dither and bias controller connected to the modulator and to the tap,
the dither and bias controller having:
a controller input connected to the tap, and
a controller output connected to the modulator,
the controller having a receiver connected to the tap for providing a bias,
a summing circuit having a bias input,
a spread-spectrum dither source connected to the summing circuit,
the summing circuit having a bias and spread-spectrum dither output connected to the controller output,
a variable gain trans-impedance amplifier connected to the receiver,
a differential amplifier connected to the variable gain trans-impedance amplifier,
a digital signal processor having an analog-to-digital converter connected to an output of the differential amplifier, the digital signal processor having an analog-to-digital converter and first and second digital-to-analog converters and having:
the spread-spectrum dither source connected to the second converter,
a multiplier connected to the analog-to-digital converter,
a second harmonic spread-spectrum dither source connected to the multiplier,
an integrator connected to the multiplier,
a tracking algorithm connected to the integrator,
wherein the first digital-to-analog converter is connected to the tracking algorithm,
a bias circuit connected to the first converter and to the summing circuit, and
an amplitude and phase control connected to the dither source and to the differential amplifier and adapted for controlling dither in an output of the differential amplifier.

6. The system of claim 5, wherein a spread-spectrum dither waveform produced by the spread-spectrum dither source has a property that its second harmonic is also a spread-spectrum signal.

7. The system of claim 5, wherein the controller holds a bias point with an arbitrary ratio of the first and second harmonics of the dither.

8. Dither and bias controller apparatus for providing a bias plus dither signal to a modulator, comprising a controller input adapted for connecting to a modulated signal output of the modulator, a controller output adapted for connecting to a bias plus dither input of the modulator, the controller having a receiver connected to a modulator output tap for providing a bias, a summing circuit having a bias input, a spread-spectrum dither signal source connected to the summing circuit, the summing circuit having a combined bias and spread-spectrum dither output connected to the controller output, further comprising a band pass filter connected to an output of the receiver and a multiplier circuit connected to the band pass filter, a frequency source connected to the multiplier circuit, a time integrator and error amplifier or power detector producing the bias connected between the multiplier circuit and the summing circuit, further comprising a frequency source connected to the multiplier circuit, wherein the frequency source is a local oscillator, wherein the spread-spectrum dither signal source produces a pseudo-random phase modulated continuous wave sinusoidal dither signal, and the local oscillator produces a continuous wave sinusoidal signal that is phase locked to the continuous wave sinusoidal dither signal.

9. The apparatus of claim 8, wherein the local oscillator produces a signal with a frequency which is about equal to a second harmonic of the spread-spectrum dither signal.

10. The apparatus of claim 8, further comprising a band-pass filter connected between the receiver and the multiplier circuit and adapted for passing a second harmonic of spread-spectrum dither signal to the multiplier circuit and rejecting noise and other frequencies.

11. Dither and bias controller apparatus for providing a bias plus dither signal to a modulator, comprising a controller input adapted for connecting to a modulated signal output of the modulator, a controller output adapted for connecting to a bias plus dither input of the modulator, the controller having a receiver connected to a modulator output tap for providing a bias, a summing circuit having a bias input, a spread-spectrum dither signal source connected to the summing circuit, the summing circuit having a combined bias and spread-spectrum dither output connected to the controller output,
   a variable gain trans-impedance amplifier connected between the receiver and the differential amplifier,
   a differential amplifier connected to the variable gain trans-impedance amplifier,
   an amplitude and phase control connected to the dither source and to the differential amplifier and adapted for controlling dither in an output of the differential amplifier,
   a digital signal processor having an analog-to-digital converter connected to an output of the differential amplifier and having:
   a multiplier connected to the analog-to-digital converter,
   a second harmonic dither source connected to the multiplier,
   an integrator connected to the multiplier,
   a tracking algorithm connected to the integrator,
   a digital-to-analog converter connected to the tracking algorithm, and
   a bias circuit connected to the digital-to-analog converter and to the summing circuit.

12. The apparatus of claim 11, wherein the spread-spectrum dither waveform produced by the spread-spectrum dither source has the property that its second harmonic is also a spread-spectrum signal.

13. The apparatus of claim 11, further comprising a bias control in the digital signal processor adapted for holding a bias point with an arbitrary ratio of first and second spread-spectrum harmonics of the spread-spectrum dither.

14. A method of controlling bias and dither applied to a modulator, comprising tapping an output of the modulator, receiving a part of the modular output from the tapping, changing the received part of the modulator output to a signal with a receiver, filtering the signal and supplying a band passed signal, providing a spread-spectrum dither signal, supplying a spread-spectrum harmonic of the spread-spectrum dither signal mixing the spread-spectrum harmonic of the spread-spectrum dither signal with the band passed signal, producing a DC bias from the mixed spread-spectrum harmonic of the spread-spectrum dither signal and the band passed signals, summing the bias plus the spread-spectrum dither signal, and providing the summed bias plus the spread-spectrum dither signal to a bias input of the modulator, further comprising providing the signal from the receiver to a trans-impedance amplifier and converting an output of the receiver to a voltage signal, amplifying the voltage signal with a receiver amplifier, filtering the amplified voltage signal with a crystal band-pass filter and passing a second harmonic signal of the spread-spectrum dither signal, amplifying the second harmonic signal of the spread-spectrum dither signal with a variable gain amplifier, filtering the amplified second harmonic signal with an active band-pass filter, providing the filtered and amplified second harmonic signal to a power detector and an error amplifier, and supplying a DC bias from the error amplifier related the spread-spectrum second harmonic signal as a bias to the optical modulator.

15. A method of controlling bias and dither applied to a modulator, comprising tapping an output of the modulator, receiving a part of the modular output from the tapping, changing the received part of the modulator output to a signal with a receiver, filtering the signal and supplying a band passed signal, providing a spread-spectrum dither signal, supplying a spread-spectrum harmonic of the spread-spectrum dither signal mixing the spread-spectrum harmonic of the spread-spectrum dither signal with the band passed signal, producing a DC bias from the mixed spread-spectrum harmonic of the spread-spectrum dither signal and the band passed signals, summing the bias plus the spread-spectrum dither signal, and providing the summed bias plus the spread-spectrum dither signal to a bias input of the modulator, wherein the providing of the spread-spectrum dither signal comprises adjusting amplitude of the spread-spectrum dither signal and filtering the adjusted amplitude spread-spectrum dither signal and removing a harmonic of the spread-spectrum dither signal before the summing of the filtered and adjusted amplitude spread-spectrum dither signal with the bias.

16. A method of controlling bias and dither applied to a modulator, comprising tapping an output of the modulator, receiving a part of the modular output from the tapping, changing the received part of the modulator output to a signal with a receiver, filtering the signal and supplying a band passed signal, providing a spread-spectrum dither signal, supplying a spread-spectrum harmonic of the spread-spectrum dither signal mixing the spread-spectrum harmonic of the spread-spectrum dither signal with the band passed signal, producing a DC bias from the mixed spread-spectrum harmonic of the spread-spectrum dither signal and the band passed signals, summing the bias plus the spread-spectrum dither signal, and providing the summed bias plus the spread-spectrum dither signal to a bias input of the modulator,
   providing a variable gain trans-impedance amplifier connected to the receiver output and the differential amplifier,
   providing a differential amplifier connected to the variable gain trans-impedance amplifier,
   providing an amplitude and phase control connected to the differential amplifier, and
   controlling an output of the differential amplifier,
   providing a digital signal processor having an analog-to-digital converter connected to an output of the differential amplifier,
   providing a multiplier connected to the analog-to-digital converter,
   providing a second harmonic dither source connected to the multiplier,
   providing an integrator connected to the multiplier,
   providing a tracking algorithm connected to the integrator and providing a digital-to-analog converter connected to the tracking algorithm, and
   providing a bias circuit connected to the digital-to-analog converter and to the summing circuit.

17. The method of claim 16, wherein a spread-spectrum dither waveform produced by the spread-spectrum dither signal has a property that the second harmonic of the spread spectrum dither waveform is also a spread-spectrum signal.

18. The method of claim 16, further comprising providing a spread-spectrum dither bias controller that holds a bias point with an arbitrary ratio of first and second spread-spectrum harmonics of the spread-spectrum dither signal.

19. A method comprising
providing a modulator,
providing a continuous wave input to the modulator,
providing radio frequency input to the modulator,
providing a bias and dither input to the modulator,
providing an output from the modulator,
providing a tap from the output of the modulator,
providing a receiver having an input connected to the tap,
providing a receiver amplifier connected to the receiver,
providing a spread-spectrum dither source,
providing a differential amplifier connected to the receiver amplifier,
providing an amplitude and phase control connected to the differential amplifier and the spread-spectrum dither source,
providing a spread-spectrum harmonic of the spread-spectrum dither,
mixing an output of the differential amplifier and the spread-spectrum harmonic,
supplying a bias,
summing the bias and the spread-spectrum dither, and
supplying the summed bias and spread-spectrum dither to a bias input of the modulator.

20. The method of claim 19, further comprising
providing a digital signal processor,
providing an analog-to-digital converter in the digital signal processor,
providing first and second digital-to-analog converters having inputs connected to the digital signal processor,
providing a spread-spectrum digital dither source in the digital signal processor connecting the dither source to an input of first digital-to-analog converter,
providing an analog spread-spectrum dither signal at an output of the first digital-to-analog converter,
providing an amplitude plus phase control having an input connected to the analog spread-spectrum dither signal,
providing an output signal from the amplitude plus phase control to the differential amplifier,
providing a digital second harmonic dither signal source in the digital signal processor,
combining the output from the analog-to-digital converter and the second harmonic dither signal as inputs to a multiplier,
providing an output of the multiplier to an integrator,
providing an output of the integrator to a tracking algorithm,
providing an output of the tracking algorithm to an input of the second digital-to-analog converter,
providing an output of the second digital-to-analog converter as a DC bias,
providing the spread-spectrum dither from the first converter to an amplitude control and producing an amplitude controlled spread-spectrum dither,
providing the amplitude controlled spread-spectrum dither and the bias to a summing circuit, and
providing an output to the adder to the bias and dither input of the optional modulator.

21. The method of claim 19, wherein a spread-spectrum dither waveform produced by the spread-spectrum dither source has a property that its second harmonic is also a spread-spectrum signal.

22. Apparatus comprising:
a bias and dither controller having an input and an output of the bias and dither controller,
a receiver connected to the bias and dither controller input,
a spread-spectrum dither source,
a spread-spectrum second harmonic source providing a spread-spectrum second harmonic of the spread-spectrum dither,
a multiplier connected to the spread-spectrum second harmonic source and connected to the receiver,
a bias circuit connected to the multiplier,
a summing circuit having summing circuit inputs connected to the bias source and to the spread-spectrum dither source and having a summing circuit output connected to the output of the bias and dither controller,
wherein the harmonic source provides a second harmonic of the spread-spectrum dither and wherein the second harmonic is also a spread-spectrum signal, and
wherein the bias circuit holds a bias point with a ratio of the first and second spread-spectrum harmonics of the spread-spectrum dither.

23. Apparatus comprising:
a bias and dither controller having an input and an output of the bias and dither controller,
a receiver connected to the bias and dither controller input,
a spread-spectrum dither source,
a spread-spectrum second harmonic source providing a spread-spectrum second harmonic of the spread-spectrum dither,
a multiplier connected to the spread-spectrum second harmonic source and connected to the receiver,
a bias circuit connected to the multiplier,
a summing circuit having summing circuit inputs connected to the bias source and to the spread-spectrum dither source and having a summing circuit output connected to the output of the bias and dither controller,
a trans-impedance amplifier connected to the receiver,
a receiver amplifier connected to the trans-impedance amplifier,
a low pass filter connected to the receiver amplifier,
a variable gain amplifier connected to the low pass filter,
an active low pass filer connected to the variable gain amplifier,
a power detector connected to the active low pass filter,
an error amplifier connected to the power detector and to the summing circuit,
an amplitude control connected to the spread-spectrum dither source, and
a notch filter connected to the amplitude control and to the summing circuit.

24. Apparatus comprising:
a bias and dither controller having an input and an output of the bias and dither controller,
a receiver connected to the bias and dither controller input,
a spread-spectrum dither source,
a spread-spectrum second harmonic source providing a spread-spectrum second harmonic of the spread-spectrum dither,
a multiplier connected to the spread-spectrum second harmonic source and connected to the receiver,
a bias circuit connected to the multiplier,
a summing circuit having summing circuit inputs connected to the bias source and to the spread-spectrum dither source and having a summing circuit output connected to the output of the bias and dither controller, a digital signal processor connected to the bias and dither controller, wherein the multiplier, the spread-spectrum dither source and the spread-spectrum second harmonic dither source are within the digital signal processor, an analog-to-digital converter connected to the receiver, a first digital-to-analog converter connected to the multiplier and connected to the summing circuit, a second digital-to-analog converter connected to the spread-spectrum dither source and connected to the summing circuit.

25. The apparatus of claim 24, further comprising an amplifier and a differential amplifier connected in series between the receiver and the analog-to digital converter, an amplitude+phase control connected to the second digital-to-analog converter and to the differential amplifier, an amplitude control connected between the second digital-to-analog converter and the summing circuit.

26. The apparatus of claim 25, further comprising an integrator and tracking algorithm within the digital signal processor connected in series between the multiplier and the first digital-to-analog converter.

* * * * *